United States Patent [19]

Coney

[11] 4,208,467
[45] Jun. 17, 1980

[54] DIELECTRIC COATING COMPOSITIONS AND RECORDING SHEETS MADE THEREFROM

[75] Inventor: Charles H. Coney, Kingsport, Tenn.

[73] Assignee: Eastman Kodak Company, Rochester, N.Y.

[21] Appl. No.: 12,412

[22] Filed: Feb. 15, 1979

Related U.S. Application Data

[62] Division of Ser. No. 850,161, Nov. 10, 1977, Pat. No. 4,153,782.

[51] Int. Cl.$^2$ .................. B32B 27/36; C08G 63/18
[52] U.S. Cl. .................. 428/480; 260/22 CQ; 428/481; 428/511; 428/913; 528/305; 528/309
[58] Field of Search .................. 260/75 R, 22 CQ; 528/302, 305, 298, 309; 428/480, 481, 913, 930, 511; 427/58, 62; 96/1 E; 106/173 R

[56] References Cited

U.S. PATENT DOCUMENTS

| | | | |
|---|---|---|---|
| 2,404,033 | 7/1946 | Burrell | 106/173 R |
| 2,590,910 | 4/1952 | Wittcoff et al. | 106/173 R X |
| 3,075,859 | 1/1963 | Relph | 428/511 X |
| 3,436,376 | 1/1969 | Duling | 528/298 |
| 3,686,361 | 8/1972 | DeWitt et al. | 528/309 X |
| 3,714,126 | 1/1973 | Reid | 528/308 X |

*Primary Examiner*—Thomas J. Herbert, Jr.
*Attorney, Agent, or Firm*—John F. Stevens; Daniel B. Reece, III

[57] ABSTRACT

Coating compositions useful as a dielectric layer for electrostatic recording sheet material are disclosed. The compositions comprise a polyester derived mainly from terephthalic acid and 1,2-propanediol. Minor amounts of isophthalic acid and ethylene glycol may be included. Preferably, the compositions include an ester prepared from gum, wood and/or tall oil rosin in an amount of up to about 70% based on the combined weight of polyester and rosin ester.

3 Claims, No Drawings

DIELECTRIC COATING COMPOSITIONS AND RECORDING SHEETS MADE THEREFROM

This is a division of Application Ser. No. 850,161 filed Nov. 10, 1977, now U.S. Pat. No. 4,153,782.

This invention relates to electrostatic recording sheets and more specifically, this invention relates to dielectric coating compositions comprising a particular polyester for application to electrically conductive substrates to form electrostatic recording sheets.

In general, electrostatic recording processes involve forming a latent image upon an electric-charge-retentive layer of an electrostatic recording sheet. The electric-charge-retentive layer is of a dielectric or insulating material capable of receiving and holding for a period of time an electric charge corresponding to an original pattern. The image-defining electrostatic charge is laid directly down upon the dielectric surface, using such electronic devices as a cathode ray tube, a pin matrix and pulsing corona discharge, or by means of a direct electrical image transfer from one surface to another. The charged spots or areas forming the pattern are then treated or developed with a visibly colored resinous powder which clings to the charged areas but which does not adhere to and is easily removed from the uncharged areas. The sheet thereafter is heated, pressed, or otherwise processed to fuse the colored powder to the spots to form a permanent visible image. Electrostatic recording sheets are useful, for example, in electronic data transmission and computer printout systems.

It is known that the electric-charge-retentive layer of the electrostatic recording sheet may consist generally of various insulating or dielectric resins. Polyethylene, polyvinylacetal, silicone resin, polyvinylacetaldehyde, polyvinylacetate, vinylacetate-vinylchloride copolymer, vinylacetate-crotonic acid copolymer, acrylic acid estermethacrylic acid ester copolymer, etc., and mixtures thereof are examples of dielectric coating materials sometimes used. These insulating resins are commonly coated onto the surface of the conductive sheet as a solution dissolved in a suitable organic solvent. The resulting product forms an electric-charge-retentive layer comprising a substantially continuous film of the insulating resin. It is desirable for the sheets in most instances to resemble plain, uncoated paper in feel and appearance.

Generally, a product used in making electrographic prints, such as a copy sheet, should include means for presenting a dielectric or insulating surface for the reception of the image-defining electrostatic charge, most usually in the form of a thin film or layer of dielectric material, and support for this film which is electrically conductive. With a suitable dielectric material selected for the film which is capable of accepting a charge transferred thereon and retaining this charge, best print resolution and density, and minimum background result in a print produced from the copy sheet if the dielectric film is relatively thin.

Electrostatic printing methods have in common the fact that the coating must accept a relatively high voltage charge and retain the charge for a reasonable period of time. The charge must remain localized until the coating is toned and the image is formed. Toner can be a finely-divided solid, or a solid finely dispersed in a liquid such as kerosene or other aliphatic hydrocarbons. The toner particles are attracted to the charged area on the coating and are held there by the opposing charges until they can be permanently fixed to the thermoplastic coating, such as by the application of heat and/or pressure.

The requirements for a suitable coating include good dielectric properties, high charge acceptance, and charge retention at relatively low coating weight (2–5 lb./3,000 ft.$^2$). Other factors to be considered are low density to reduce coating weight, price, resistance to hydrocarbon solvents (toner bath), resistance to curling, a surface that can be written upon by pen or pencil, effect of humidity on electrical characteristics, and an appearance and feel similar to uncoated paper. I have found that the coating according to our invention meets the above criteria for the electrostatic printing industry.

U.S. Pat. No. 3,075,859 discusses electrostatic printing and mentions many materials including polyesters which may be used as a dielectric material. This patent, however, does not suggest that a particular polyester would have unexpectedly superior properties as a dielectric coating. Japanese Pat. No. 2,069,632 also deals with electrophotographic light sensitive bodies, an intermediate layer of which is selected from a variety of materials including polyesters. Other patents, for example, U.S. Pat. Nos. 3,110,621; 3,264,137; 3,581,661; 3,629,000; 3,585,061; and 3,634,135 disclose various polymers useful as a dielectric material. Also, U.S. Pat. Nos. 2,404,033 and 2,590,910 disclose rosin esters compatible with cellulose esters generally.

The dielectric coating compositions of the present invention offer improvements in one or more respects with regard to such dielectric compositions presently known. In the past, it has been difficult to find a dielectric coating composition which offered the combination of desirable features found in the composition of the present invention.

An object of this invention therefore is to provide relatively inexpensive, high performance, dielectric coating compositions for copying computer printouts, and other electrographic applications giving sharp, clear, toned prints.

Another object of this invention is to provide dielectric coating compositions with fast charge acceptance times.

A further object of this invention is to provide dielectric coating compositions with long charge holding times.

Still another object of this invention is to provide electrostatic recording sheets with dielectric coating compositions which are relatively unaffected in electrical responses by chages in relative humidity.

Other objects and advantages of this invention will appear hereinafter.

I have discovered that a particular polyester surprisingly has unique properties and gives good results compared to other polyesters when used as a dielectric coating. The performance is critically dependent upon the use of a polyester derived from a particular dicarboxylic acid and glycol.

I have further discovered that the charge holding time of the polyesters of the particular compositions can be increased to a surprisingly high extent incorporating carboxyl-containing resins into the compositions.

The dielectric coating composition of this invention comprises an amorphous polyester, preferably blended with a rosin ester. The polyester component of the composition is derived from the following, on the basis of 100 mol % dicarboxylic acid and 100 mol % glycol:

(a) at least about 70 mol % terephthalic acid or an ester forming derivative thereof (i.e., dimethyl terephthalate). Up to about 30 mol % of the acid component may be isophthalic acid. It is preferred that the acid component be at least 90 mol % terephthalic acid with the remainder if any, being isophthalic acid.

(b) at least about 70 mol % 1,2-propanediol. Up to about 30 mol % of the glycol component may be ethylene glycol. It is preferred that the glycol component be at least about 90 mol % 1,2-propanediol with the remainder, if any, being ethylene glycol.

The polyester component is made by conventional condensation polymerization procedures well known in the art. The inherent viscosity of the polyester is preferably between about 0.2 and 0.5 as determined at 23° C. using 0.5 gram of polymer per 100 ml. of a solvent consisting of a 60/40 mixture of phenol/tetrachloroethane. This polyester produces coatings with high surface resistivity, good charge acceptance, and excellent charge retention especially when blended with certain modifying resins. The coatings prepared from this polyester do not impart excessive curl to the paper as is the case with other polyesters as a class, but do provide a surface that can be written upon by pen or pencil. Conductive paper coated with polyesters blended with rosin ester resins produce a coating that can be electrostatically printed and stored for hours before toning without loss of image quality.

Rosin esters useful as modifying resins are well known to the art. Many are commercially available and are generally made from gum rosin, wood rosin, tall oil rosin or a combination thereof. Such rosins contain a variety of acids such as pimaric, levopimaric, palustric, isopimaric, dehydroabietic, abietic and neoabietic. The concentration of the various acids varies from one type of rosin to another. In general, any of the conventional, commercially available rosin esters are suitable for use in this invention. Maleic modified rosin resins are preferred. Acid numbers of the rosin esters may range between about 6 and about 255. Polybasic acids or anhydrides may be included, such as phthalic or maleic, or any of those commonly employed in the preparation of alkyd resins.

Rosin esters are described in the literature, for example in "Rosin Based Alkali Soluble Resins" from "American Ink Maker", September, 1976, and U.S. Pat. No. 2,590,910. In general there are two different ways to react the basic ingredients of the rosin ester, as described in the article, "Rosin Based Alkali Soluble Resins," from the September, 1976, issue of "American Ink Maker."

In the first method, the rosin is first reacted with an acid or anhydride (such as maleic anhydride, fumaric acid or acrylic acid) and then this adduct is reacted further by esterification. This reaction sequence gives products which are quite uniform and gives the most complete reaction of rosin and acid or anhydride. The disadvantages are that this is time consuming and causes difficulty when using low boiling polyols.

The second method is the simultaneous reaction between the rosin and unsaturated acid or anhydride as well as the esterification of the acid or anhydride. This method is easier to accomplish from a production standpoint and allows a broad variety of raw materials to be used. The resins reacted by the second method, however, generally have more rosin unreacted with acid or anhydride and are not as uniform as those produced by the first method.

The procedure for simple esterification may follow any of those ordinarily employed for rosin acid esterification. The rosin is generally melted and the polyhydroxy material may be added all at once or gradually over several hours. Stirring and an inert atmosphere are advisable, and temperatures as high as 300° C. may be employed for periods of time ranging from two to eighteen hours. However, a period of time varying from six to eight hours is usually sufficient to obtain a low acid number. The water of reaction may be removed azeotropically or by bubbling an inert gas through the reaction mixture. The application of a vacuum, especially at the end of the reaction, is likewise advisable. In addition, catalysts such as metallic stearates, acidic catalysts such as zinc chloride, mineral acids, or p-toluene sulfonic acids, and the like, facilitate the reaction.

Polyols which may be used in the esterification include those having from 1 to about 8 carbon atoms, such as ethylene glycol, propylene glycol, diethylene glycol, triethylene glycol, neopentyl glycol, 1,3-butanediol, 1,4-butanediol, glycerine, trimethylolethane, trimethylolpropane and pentaerythritol.

Examples of commercially available rosin ester resins include Uni-Rez 7019 maleated resin sold by Union Camp, Lewisol 821 resin sold by Monsanto, and Ester Gum H rosin ester sold by Hercules.

The coating compositions according to this invention may be applied by conventional coating techniques, for example, from a solvent system. When the polyester alone is used as a coating, it may be dissolved in well known solvents to form a solution containing between 5% and 35% solids. Suitable solvents include toluene, and mixtures of toluene with acetone, ethyl alcohol, and ethyl acetate.

The polyester used in this invention has the advantage of being soluble in toluene. The use of this low cost, nonpolar solvent allows casting of thin films of the polyester onto the surface of the polar electroconductive coating without a contamination of the polyester coating from the electroconductive coating which would result in an impairment of its electrical performance. This polyester also has advantages of low color, clarity, low odor, and toughness. When coated onto paper at the required thickness, it will withstand writing pressures from pen or pencil.

This polyester may be pigmented with titanium dioxide, silicas, and filler pigments such as clay, diatomaceous earth and talc, by normal dispersion techniques to give the appearance and writing properties required. Colored pigments and dyes may be incorporated for achieving special effects.

The softening point of this polyester is sufficiently high so that it should resist blocking of the coated paper during storage and use. We have found that this polyester provides a good anchoring surface for the toner when fused with heat, thus giving high permanency and resistance to rub-off.

When a blend of polyester and rosin ester is used, the blend may be dissolved in a solvent system to form a solution containing between 5% and 50% solids. When the blends of polyester and rosin esters are used, the amount of rosin may be up to about 70% based on the combined weight of polyester and rosin ester. Preferably, the rosin ester accounts for between about 20 and about 40% of the combined weight of polyester and rosin ester. The coating solution may be applied using conventional techniques such as roll coating, dipping, spraying, knifing, etc. Also, the composition may be applied as a hot melt.

The inclusion of a small amount of a plasticizer is helpful to prevent curling of the recording sheet material. Among those plasticizers which provide freedom from curling are the low molecular weight diesters such as dimethyl phthalate (DMP), diethyl phthalate (DEP), dibutyl phthalate (DBP), and dimethoxyethyl phthalate (DMEP). An amount of 5–30 parts (based on the combined weight of cellulose ester and rosin ester) plasticizer with 95–70 parts of polyester is effective and 10–20 parts of plasticizer with 90–80 parts of polyester being the preferred ratios.

Various substrates may be used in electrostatic printing upon which this coating composition would be applied. Electrically conductive paper is perhaps the most common, but electrically conductive cloth, wood, plastics and metals may be used.

The examples which follow are submitted for a better understanding of the invention. The electrical properties are measured using an Honestometer, at the following conditions: volts at probe, 10,000; probe distance from sample, 1.75 cm; detector distance from sample, 3.25 cm; 54% relative humidity and 75° F. The print quality is rated as E-excellent; F-fair, P-poor. The coating compositions are prepared in a solvent consisting of 1 part toluene and 1 part ethyl acetate at a solids level of 25%, and applied to an electrically conductive paper substrate. The samples are aged for 72 hours and listed under the indicated humidity and temperature conditions.

The polyester used is prepared, using conventional techniques, from terephthalic acid or dimethyl terephthalate and 1,2-propanediol. However, when the polyesters are modified with about 10 mol % isophthalic acid and 10 mol % ethylene glycol, similar results are obtained.

The test specimens are prepared by casting with wire wound rods, the polymers from solvent solution onto the surface of commercially prepared electroconductive paper, and allowing to dry at ambient conditions. The specimens are conditioned at 54% relative humidity and 27° C. All values given in the examples are averages of three specimens. Each group is conducted at one time and generally comparisons shall be made only within the group. Polyvinyl butyral is selected as a comparative material. Unless otherwise stated, the I.V. of the poly-(propylene terephthalate) is 0.46.

Examples 1–4 illustrate the effect of varying the I.V. of the polyester, with generally increasingly good results as the I.V. is increased. Since the nonvolatile content is maintained at 25% for all solutions, the viscosity of the solutions varies with I.V. Thus, the lower I.V. resins, having lower solution viscosities, have greater penetration and mixing with the electroconductive coating materials, and correspondingly, less effectiveness as dielectric coatings. In practice, however, this may be overcome by increasing the nonvolatile content of the solutions of low I.V. materials thus giving less contamination from the electroconductive components and better electrical performance.

Examples 5–10 indicate surprisingly good electrical performance as the composition is modified with commercially available rosin esters. Examples 11–23 illustrate the effect of using plasticizers in the unmodified polyester coatings. Example 24 is a control, showing for comparison the electrical properties of polyvinyl butyral.

TABLE I

| Example | I.V. | Coating Weight Lbs./3,000 Ft.$^2$ | Time to 120 Volts, Seconds | Maximum Charge Volts | Half-Life, Seconds | Discharge to 110 Volt, Seconds |
|---|---|---|---|---|---|---|
| 1 | 0.28 | 4.0 | — | 100 | — | — |
| 2 | 0.35 | 3.5 | 8.2 | 203 | 370 | 415 |
| 3 | 0.39 | 3.3 | 7.5 | 192 | 157 | 154 |
| 4 | 0.46 | 3.0 | 6.3 | 211 | 277 | 330 |

TABLE II

| Example | Modification | Coating Weight Lbs./3,000 Ft.$^2$ | Time to 120 Volts, Seconds | Maximum Charge, Volts | Half-Life, Seconds |
|---|---|---|---|---|---|
| 5 | 20% Lewisol 28 | 4.9 | 3 | 296 | 1115 |
| 6 | 40% Lewisol 28 | 6.1 | 3 | 331 | 1236 |
| 7 | 20% Uni-Rez 7019 | 5.0 | 3 | 332 | 1646 |
| 8 | 40% Uni-Rez 7019 | 5.9 | 2.8 | 324 | 2022 |
| 9 | 20% Lewisol 821 | 5.2 | 2.5 | 321 | 2068 |
| 10 | 40% Lewisol 821 | 5.6 | 2 | 357 | 2167 |

TABLE III

| Example | Plasticizer | Coating Weight Lbs./3,000 Ft.$^2$ | Time to 120 Volts, Seconds | Maximum Charge Volts | Half-Life, Seconds | Discharge to 120 Volts, Seconds |
|---|---|---|---|---|---|---|
| 11 | None | 4.6 | 11 | 172 | 315 | 152 |
| 12 | 5% DMP | 5.0 | 6 | 250 | 1150 | 1400 |
| 13 | 10% DMP | 4.5 | 5 | 245 | 395 | 633 |
| 14 | 15% DMP | 4.3 | 6.8 | 236 | 60 | 86 |
| 15 | 5% DEP | 5.0 | 5.3 | 233 | 593 | 773 |
| 16 | 10% DEP | 4.0 | 6.3 | 214 | 610 | 700 |
| 17 | 15% DEP | 4.2 | 7 | 220 | 36 | 42 |
| 18 | 5% DBP | 4.8 | 4.5 | 240 | 840 | 1000 |
| 19 | 10% DBP | 4.5 | 5.3 | 260 | 371 | 483 |
| 20 | 15% DBP | 4.1 | 5 | 249 | 34 | 55 |
| 21 | 5% DMEP | 4.4 | 5 | 254 | 650 | 1000 |
| 22 | 10% DMEP | 4.8 | 3.8 | 275 | 226 | 382 |
| 23 | 15% DMEP | 4.2 | 6 | 216 | 22 | 26 |

TABLE III-continued

| Example | Plasticizer | Coating Weight Lbs./3,000 Ft.$^2$ | Time to 120 Volts, Seconds | Maximum Charge Volts | Half-Life, Seconds | Discharge to 120 Volts, Seconds |
|---|---|---|---|---|---|---|
| 24 (Control) | | 2.8 | 3.8 | 293 | 105 | 203 |

In order to determine the print quality of the various coating compositions, a device is assembled that simulates an electrostatic printing operation. The equipment consists of a variable DC voltage supply, an aluminum print plate that forms one electrode and can be manipulated by an air piston and timed to contact the coated sample, a toning bath, and finally heat fixing with an oven at 150° C. The printing experiment is conducted on the six examples. The printing electrode is charged to 800 volts which contacted the coating for about one-tenth of a second. The samples are then toned at various time intervals after charging ranging essentially from zero delay to a two-hour delay.

EXAMPLE 25

A coating of poly(propylene terephthalate) (20% in toluene) with an I.V. of 0.46 is applied to electroconductive paper at a dry coating weight of 3.0 pounds per 3,000 ft.$^2$. Several specimens of this coated paper are imaged with an electrical contact of 800 volts for 0.1 second. One specimen is toned immediately and the others are toned at 1 hour, 2 hours, 72 hours, 144 hours and 312 hours, after remaining at open, ambient conditions. The image formed immediately is sharp and clear and the subsequently formed images are just as clear, including the image formed after aging for 312 hours.

EXAMPLE 26

A 20% solution of polyvinyl butyral in a mixture of 40% ethyl alcohol and 60% toluene is applied to electroconductive paper with a wire-wound rod to give a dry coating weight of 3.2 pounds per 3,000 ft.$^2$. Specimens of this coated paper are imaged electrically and individually toned at time intervals of 0 minutes, 1 hour, 2 hours, and 72 hours. The zero time, 1-hour, and 2-hour specimens give fair images, but the 72-hour specimen produces no image.

Unless otherwise indicated, all parts, ratios, percentages, etc., are on a weight basis.

The invention has been described in detail with particular reference to preferred embodiments thereof, but it will be understood that variations and modifications can be effected within the spirit and scope of the invention.

I claim:

1. An electrostatic recording sheet having an electrically conductive substrate and an electric-charge-retentive dielectric coating, said coating comprising a polyester derived from, based on 100 mol percent dicarboxylic acid and 100 mol percent glycol, at least 70 mol percent terephthalic acid or an ester forming derivative thereof, and at least 70 mol percent 1,2-propanediol, said polyester having an inherent viscosity of between about 0.2 and about 0.5.

2. An electrostatic recording sheet having an electrically conductive substrate and an electric-charge-retentive dielectric coating, said coating comprising a polyester derived from, based on 100 mol percent dicarboxylic acid and 100 mol percent glycol, at least 90 mol percent terephthalic acid or an ester forming derivative thereof, and at least 90 mol percent 1,2-propanediol, said polyester having an inherent viscosity of between about 0.2 and about 0.5.

3. An electrostatic recording sheet having an electrically conductive substrate and an electric-charge-retentive dielectric coating, said coating comprising:
 (a) a polyester derived from, based on 100 mol percent dicarboxylic acid and 100 mol percent gylcol, at least 70 mol percent terephthalic acid or an ester forming derivative thereof, and at least 70 mol percent 1,2-propanediol, said polyester having an inherent viscosity of between about 0.2 and 0.5, and
 (b) a resin ester derived from rosin acid and a polyhydric alcohol having from 1 to about 8 carbon atoms, said rosin ester being present in an amount of from about 0.1% to about 70%, based on the combined weight of polyester and rosin ester.

* * * * *